June 13, 1944.  L. H. SCHWARTZ ET AL  2,351,548
FREQUENCY COMPARISON RECORDER
Filed Dec. 24, 1942

INVENTORS: L. H. SCHWARTZ
H. A. TOOKER
BY
W. C. Parnell
ATTORNEY

Patented June 13, 1944

2,351,548

UNITED STATES PATENT OFFICE 2,351,548

FREQUENCY COMPARISON RECORDER

Lyle H. Schwartz, Maplewood, N. J., and Howard A. Tooker, Monroe, N. Y., assignors to Western Electric Company, Incorporated, New York, N. Y., a corporation of New York Application December 24, 1942, Serial No. 470,114

6 Claims. (Cl. 234—1.5)

This invention relates to a method and apparatus for comparing the frequencies of electric currents and particularly to the manner in which the direction of deviation of one frequency from the other is determined.

An unknown high frequency is commonly measured by intermodulating it with a known frequency to generate a beat frequency. The unknown may differ in either direction from the known frequency and this question is usually resolved by changing one of the frequencies slightly in a known direction and observing the direction of change in the beat frequency.

In some cases, however, it is impracticable to change the frequency of either source. This is true for example when a secondary standard frequency is being checked against a primary standard or in any case where the two frequencies being compared are not subject to the control of the operator making the test.

According to this invention the modulator to which the two frequency sources are connected has in its output circuit a recording meter, the stylus of which oscillates at the beat frequency and makes on the moving record member an approximately sinusoidal trace from which the frequency deviation may be determined with great accuracy. In one of the circuits between the frequency sources and the modulator, means is provided for introducing a sudden phase shift in a known direction in the current in that circuit. This change of phase produces a momentary change in the frequency of the current and hence a momentary change in the velocity of the recorder stylus. The effect on the recorded trace is distinctive and from these distinctive markings the direction of the deviation is determined by inspection.

The amplitude of the record trace is preferably changed during the interval in which the phase is shifted so as to set off in the record an easily identifiable block which contains the distinctive markings to be examined.

According to a further feature of the invention the direction of frequency deviation is recorded automatically at predetermined intervals by operating the phase shifting means under the control of suitable timing mechanism.

Figure 1:
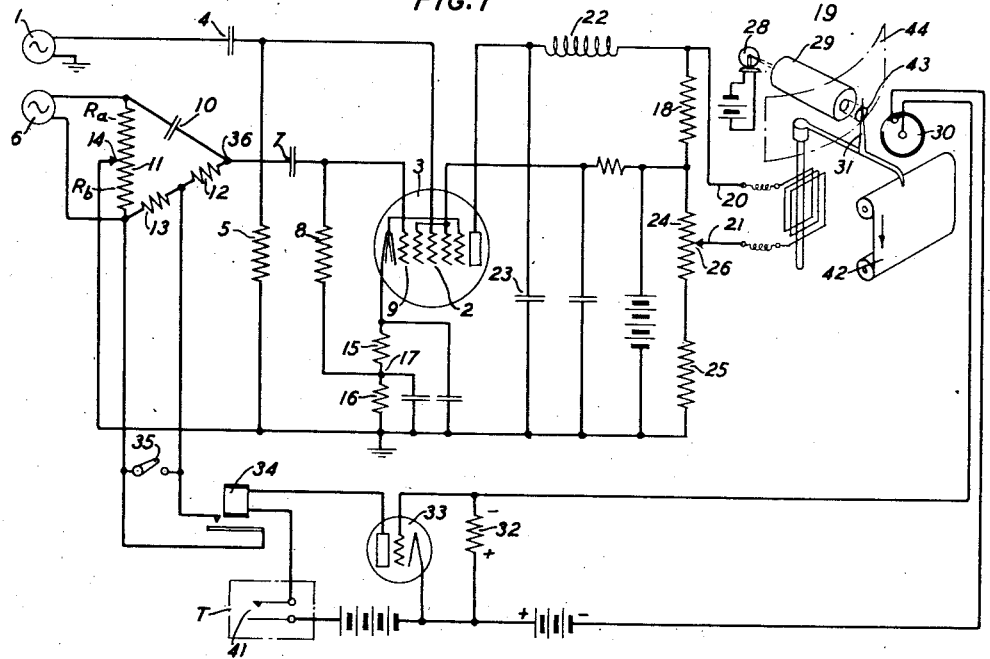
Figure 2:
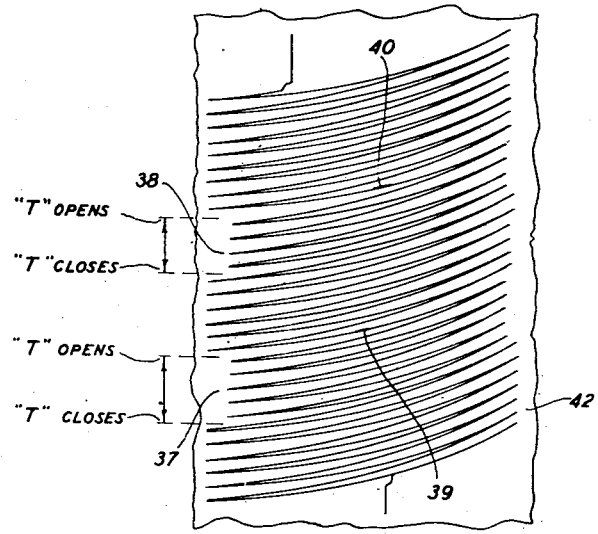

These and other features of the invention will be more clearly understood from the following detailed description and the accompanying drawing in which Fig. 1 is a frequency comparison indicator according to the invention and Fig. 2 is a representation of a portion of the record trace made by the indicator of Fig. 1.

In the drawing the source 1 of one of the frequencies to be compared is connected to the grid 2 of the modulator tube 3 by means of conventional coupling consisting of a condenser 4 and a resistor 5. The other source 6 has a similar coupling comprising a condenser 7 and a resistor 8 connecting it to the grid 9 of the tube. Interposed between the source 6 and this coupling, however, there is a bridge network comprising a condenser 10 and resistors 11, 12 and 13.

The resistor 11 has a movable contact 14 connected to ground and the resistors 12 and 13 have a combined resistance equal to the impedance of the condenser 10 at the frequency of the source 6. As long as the contact 14 is at the mid-point of resistor 11, the voltage applied to the grid 9 will be numerically equal to one-half the voltage of the source 6 but the phase of this voltage with respect to the phase of the voltage across resistor 11 may be changed by changing the value of resistor 12 or resistor 13.

Proper bias for the grid 2 is provided by the cathode resistors 15 and 16 and these resistors are proportioned so that proper bias for the grid 9 is obtained by connecting resistor 8 to their junction point 17.

In the output circuit, a potential alternating at the difference frequency of the sources 1 and 6 appears across the resistor 18 and is applied to the recording meter 19 over conductors 20, 21 but the higher frequency modulation products are excluded by a low-pass filter comprising a coil 22 and a condenser 23. The meter 19 may be of any type which is suitable for producing an oscillating trace on a clock-driven record strip 42 of the general nature shown in Fig. 2. One meter which has been found well adapted for the purposes of this invention is the model A. W. made by the Esterline-Angus Company and described in Bulletin No. 333. However, since the steady current required to bias such meters to mid-scale position is ordinarily much smaller than the plate current of the modulator tube, the power supply is shunted by resistors 24 and 25 and the output lead 21 has cooperating with the resistor 24 a movable contact 26 by means of which the direct component of the meter current may be adjusted to give a mid-scale reading.

The meter is provided above the stylus 27 with a lamp 28 and a light guide 29 which directs a beam on the photocell 30 except when the beam is intercepted by a shutter 31 carried by the stylus arm. The particular meter mentioned above is readily converted to the purposes of this invention by making a small light aperture 43 in the scale 44 of the meter and utilizing the indicating needle on the stylus arm as the shutter 31.

The photocell current in resistor 32 provides a blocking bias for the gas-filled tube 33. The output circuit of the tube 33 includes a relay 34 and suitable timing mechanism T which completes the output circuit at desired intervals. The introduction of the phase shift may be controlled, of course, in various other ways, such as by electrical contacts operated directly by the stylus arm, but if any such simple expedients are used great care must be taken to avoid impairing the operation of the meter.

From the foregoing circuit description it will be clear that with potentials of different frequencies applied from the sources 1 and 6 to the modulator tube 3, the meter 19 will produce on the record strip a trace of the type shown in Fig. 2. Knowing the length of record strip which passes the stylus per second, the frequency deviation of one of the sources from the other is readily determined by counting the number of stylus excursions.

To determine the direction of this deviation resistor 13 is short-circuited either manually by the key 35 or automatically as described below. The current through condenser 10 and resistors 12 and 13 is normally advanced in phase with respect to the current through resistor 11 by an angle determined by the relative values of the condenser and resistor impedances and when resistor 13 is short-circuited the capacitative reactance of the condenser becomes a greater proportion of the total impedance and the potential at point 36, which is connected to the grid 9, is further advanced in phase with respect to its former relation to the potential applied to the grid 2 from the source 1.

This advance in phase is equivalent to momentary increase in the frequency of the source 6 but its effect on the record trace will depend on which of the two frequencies is higher. If the frequency advanced is higher, the beat frequency and stylus velocity are momentarily increased and the record is abruptly straightened or, in other words, the cycle being traced occupies a shorter length on the time scale of the record. On the other hand, if the frequency advanced is lower than the other, the beat frequency and stylus velocity are momentarily reduced and a hooked loop appears in that cycle of the record trace and it occupies a longer length in the time scale of the record.

When the short-circuit is removed from the resistor 13, the phase of the frequency is retarded so that in determining the direction of frequency deviation it is necessary to know which of these characteristic changes in the trace appears first when the phase is changed. This is greatly facilitated by producing a small change in amplitude in the trace simultaneously with the phase change so as to set off for easy identification a block which must be examined. Such a change in amplitude is readily obtained in the circuit shown merely by operating the circuit with the contact 14 on the resistor slightly to one side of the mid-position. Under this condition the value of the grid potential as well as its phase is varied when the resistor 13 is short-circuited.

If, for example, the contact 14 is slightly below mid-position, the normal grid potential will be slightly greater than before but when the resistor 13 is short-circuited, the grid potential is noticeably reduced and the amplitude of the record trace will be correspondingly less as shown at 37 and 38 in Fig. 2.

The record strip 42, a portion of which is shown in Fig. 2, was moving downwardly with respect to the stylus as indicated in Fig. 1 and, although the difference frequency and record motion in this case are such that no distinctive marking is readily observed at the beginning of the blocks 37 and 38 of Fig. 2, the hooked loops 39 and 40 are easily seen to be at the end of the blocks. Since these loops correspond to a slowing down of the stylus or a reduction on the difference frequency, when the short-circuit was removed and the phase was retarded to decrease, momentarily, the frequency applied to grid 9, it follows that at the time blocks 37 and 38 were traced the source 6 was of a higher frequency than the source 1. Conversely, if the loops had occurred at the beginning of the blocks, it would indicate that the source 6 was lower in frequency than the source 1.

When the direction of the frequency deviation is to be determined automatically, the clock mechanism or other suitable timing device T is adapted to close its contacts 41 at suitable intervals and maintain them closed for the time required to produce a suitable block on the record. When the contacts are closed potential is applied to the plate of the gas discharge tube 33 and when, on the next interruption of the beam of light from the lamp 28 by the shutter 31 carried by the recorder stylus arm, the high negative bias on the grid of the tube 33 is reduced, the tube becomes conducting and the relay 34 is operated to short-circuit the resistor 13 and advance the phase as already described in connection with the manual operation by the key 35. The restoration of normal bias on the grid of the tube 33 cannot extinguish the tube and the relay 34 therefore remains operated until released by the opening of the contacts 41 in the timing mechanism.

The use of the photocell and shutter in conjunction with the timing mechanism in the manner described is a further aid in determining the direction of frequency deviation since it insures that the phase shift will always be introduced at about the mid-scale position of the stylus.

With this automatic mechanism it will be seen that frequency comparison tests may be conducted over long periods of time without requiring the services of an attendant since both the frequency deviation and its direction at any particular time can be readily determined by inspection of the record. It will also be clear that the phase shift may be introduced in the circuit from either source and that the procedure described is particularly useful where the operator has no control over the frequency sources.

For frequencies of the order of 100 kilocycles, variations of ± one-quarter cycle per million are easily measured with this apparatus and when the frequencies to be compared are of a lower order, the same precision is readily obtained by deriving from them harmonic frequencies suitable for comparison purposes.

What is claimed is:

1. In a frequency comparison recorder, the combination with a source of current of standard frequency, a source of current of unknown frequency, means for generating a current of a frequency equal to the difference in the frequencies of the currents from the sources and a recording meter associated with the generating means, of means for changing the relative phases of the currents from the sources without changing the frequency of either source to produce in the record made by the meter an indication of the direction of deviation of the unknown from the standard frequency.

2. A recorder according to claim 1 in which the phase changing means comprises a resistance-capacity network connected between one of the sources of current and the difference frequency generating means and means for changing the resistance of the network.

3. A recorder according to claim 1 in which the phase changing means comprises a resistance-capacity network connected between one of the sources of current and the difference frequency generating means, a relay for short-circuiting a portion of the resistance of the network, timing mechanism for periodically preparing an operating circuit for the relay and means controlled by the meter for completing the relay circuit at predetermined point in the cycle of the current of the difference frequency.

4. A recorder according to claim 1 having means operative when the relative phases are changed to change the amplitude of the current of difference frequency.

5. A recorder according to claim 1 in combination with means for automatically changing the relative phases of the currents from the sources at predetermined intervals.

6. A recorder according to claim 1 in combination with means for automatically changing the relative phases of the currents from the sources and means controlled by the meter for initiating the operation of the phase changing means.

LYLE H. SCHWARTZ.
HOWARD A. TOOKER.